(12) United States Patent
Morii et al.

(10) Patent No.: US 7,736,827 B2
(45) Date of Patent: Jun. 15, 2010

(54) DEVELOPER RECYCLING METHOD

(75) Inventors: Yoshihiro Morii, Kanagawa (JP);
Hiroyuki Matsuura, Shizuoka (JP);
Takeshi Sugimoto, Shizuoka (JP);
Kazuma Torii, Shizuoka (JP)

(73) Assignees: Ricoh Company, Limited, Tokyo (JP);
Shinko-Frex Inc., Hamamatsu (JP)

( * ) Notice: Subject to any disclaimer, the term of this patent is extended or adjusted under 35 U.S.C. 154(b) by 652 days.

(21) Appl. No.: 11/465,606

(22) Filed: Aug. 18, 2006

(65) Prior Publication Data
US 2007/0089561 A1   Apr. 26, 2007

(30) Foreign Application Priority Data
Oct. 21, 2005   (JP) .............................. 2005-307213

(51) Int. Cl.
*G03G 9/00* (2006.01)
(52) U.S. Cl. ............................ 430/111.31; 430/119.87; 430/111.1; 430/111.32; 430/111.33; 430/111.34; 399/25; 399/12; 399/24; 399/109; 399/253
(58) Field of Classification Search ....................... None
See application file for complete search history.

(56) References Cited

U.S. PATENT DOCUMENTS

| | | | | |
|---|---|---|---|---|
| 3,239,465 | A * | 3/1966 | Rheinfrank | 430/106.2 |
| 5,638,159 | A * | 6/1997 | Kai et al. | 399/253 |
| 6,842,596 | B2 | 1/2005 | Morii et al. | |
| 2004/0229152 | A1 * | 11/2004 | Kurosu | 430/122 |
| 2006/0000309 | A1 | 1/2006 | Morii et al. | |

FOREIGN PATENT DOCUMENTS

| | | | |
|---|---|---|---|
| EP | 1382694 A1 | * | 1/2004 |
| JP | 01-225716 | * | 9/1989 |
| JP | 2000-181958 | | 6/2000 |
| JP | 3133146 | | 11/2000 |
| JP | 2001-42576 | | 2/2001 |
| JP | 2001-290311 | | 10/2001 |
| JP | 2003-251323 | | 9/2003 |
| JP | 2004-27125 | | 1/2004 |
| JP | 2004-33960 | | 2/2004 |
| JP | 2004-286854 | | 10/2004 |

* cited by examiner

*Primary Examiner*—Melvin C Mayes
*Assistant Examiner*—Smita Patel
(74) *Attorney, Agent, or Firm*—Oblon, Spivak, McClelland, Maier & Neustadt, L.L.P.

(57) ABSTRACT

In a method for recycling a double component developer that contains a carrier and a toner used for an image forming device such as office automation equipment, an economic value of recycling is increased, thereby allowing a company to carry out an active and sustainable environmental activity. Material components of a carrier are completely utilized, so that a process of removing and disposing part of components of the carrier, which is present in the conventional technology of a carrier recycling, is omitted from a recycling system, and in consequence, a cost of recycling is minimized. Furthermore, as well as a subject of the recycling, i.e. a carrier itself, a more valuable material, i.e. a platinum group metal, is utilized for the recycling.

14 Claims, 8 Drawing Sheets

FIG.5

| | | 05b | | |
|---|---|---|---|---|
| PRODUCT NAME: WASTE CARRIER PRODUCT CODE: AA11-22 | 2005.1 | 2005.2 | 2005.3 | |
| REQUESTED PURCHASE AMOUNT OF CARRIER | dd kg | ee kg | ff kg | |
| (LOT NUMBER) | K-1021 | K-1100 | K-3210 | |

05a, 05e, 05c, 05d

DEVELOPER RECYCLING METHOD

CROSS-REFERENCE TO RELATED APPLICATIONS

The present document incorporates by reference the entire contents of Japanese priority document, 2005-307213 filed in Japan on Oct. 21, 2005.

BACKGROUND OF THE INVENTION

1. Field of the Invention

The present invention generally relates to a method of recycling a developer for office automation equipment. More specifically, the present invention relates to a method of recycling a double component developer that contains a carrier and a toner.

2. Description of the Related Art

Recently environmental issues are getting more significant.

There is an urgent need of recycling products, parts, and materials to utilize them efficiently in light of effective use of resources and reduction in wastes for a company.

Recycling practice can be categorized into the following approaches.

An approach 1 is captive reuse, according to which a user who uses a product reuses part of the product, such as parts, by him/herself. Captive reuse is assumed that a user can practice easily, as a result, this approach can achieve the largest reduction in environmental stress as well as the highest cost effectiveness.

An approach 2 is reuse of a product, according to which a used product is collected from the market (hereinafter, collected device) to be reused as a recycled device via a certain recycling process. This approach allows most part of the used product to be reused as it is, and can reduce an environmental stress considerably.

An approach 3 is reuse of a part, according to which a part or a unit is removed from a collected device to be reused as a part or a unit within a product newly manufactured. This approach can omit a manufacturing process of the part or the unit, which is initially manufactured with a substantial amount of energy, thereby reducing environmental stress substantially.

An approach 4 is material recycle, according to which a collected device is disassembled and sorted into each unit of materials, which is to be reused as a recycled material via a certain treatment. This approach can be categorized into two: closed-loop material recycle brings the recycled material to be reused as a material of a product in the same field as the collected device; and open-loop material recycle brings the recycled material to be reused as a material of a product in another field.

An approach 5 is regeneration of a raw material, according to which a collected device is disassembled, sorted, and ultimately brought back to a raw material to be reused. This approach can achieve zero waste.

An approach 6 is energy recovery, according to which plastics are incinerated to effectively utilize thermal energy arising from incineration.

In terms of reduction in environmental stress, the most desirable approach in the above 1 to 6 is the approach 1, then followed by 2, 3, . . . , and 6 in this order. Therefore, how to sustain recycling with a more desirable approach in the six approaches is critical for a company to promote recycling in practice. In fact, for example, a product cannot semi-permanently remain being treated only with captive reuse of the approach 1, although it is the most desirable. After a certain period of time, this approach has to be abandoned for the product. Because a function of the product is degraded after a certain period of time, and the function is no longer functional for markets (or users), recycling the product with this approach inevitably loses its economic value.

In such a case, recycling the product that has been performed with an upper approach shifts to a lower approach. For example, a product that has been recycled with the captive use is going to be recycled with the approach 2 or a lower approach. Thus, the product is recycled with the lower approach for a certain period of time, and when the product is degraded, then recycling shifts a still lower approach, and so on.

Therefore, performing only part of the approaches 1 to 6 is insufficient, but the whole approaches need to be performed in recycling. In practice, the approaches 1 to 6 have to be performed across related products in parallel. The reason for this is that the approaches 1 to 6 are different depending on a type of each product. Moreover, even if focusing on one product, a level of recycling approach for each of parts and units can vary.

Japanese Patent Application Laid-open No. 2000-181958 titled "Recycling System" discloses the above recycling. A concept of the recycling method and system is clarified in a flow (comet circle) shown in FIG. 8 of Japanese Patent Application Laid-open No. 2000-181958. In a practice of recycling, how to bring this basic concept (the comet circle) into operation is vital.

Particularly, in cases of office automation equipment, such as photocopy machines and facsimiles, used products includes a developer that is used as supplies as well as a machine body and its parts. Such an image forming device generally employs a dry type of electrostatic copying in recent days, in which the developer is generally powder. Therefore, one of significant aspects for office automation equipment is how to establish a recycling system of a powder (a developer) in practice.

To involve a company in a sustainable environmental activity, it is significant to form the environmental activity itself consistent with an economic interest. It is desirable if costs of the environmental activity are decreased as much as possible, and furthermore, the environmental activity and a profit making activity are carried out on the same axis, so that the environmental activity itself becomes profitable in the end. In other words, the recycling approaches 1 to 6 are desired to be operated for value rather than as an onerous contract.

One of conventional proposals, for example, Japanese Patent Application Laid-open No. 2001-290311, discloses recycling of a developer for office automation equipment, titled "Method and Apparatus for Separating and Recycling a Coating Resin and a Magnetic Substance of a Carrier for Electrophotography."

The publication suggests a method of a reuse of a carrier. The carrier includes a magnetic substance and a coating resin, and forms a developer with a toner. The coating resin can be separated from the magnetic substance through a treatment under a condition of supercritical water or subcritical water. The method is very innovative due to a small environmental influence arising from the condition for recycling (reuse of the carrier). However, the method has an economical disadvantage. Setting the condition of supercritical water or subcritical water results in a relatively large cost compared with producing a new carrier. Consequently, a company cannot make a profit from a carrier recycled by the method proposed above. Therefore, the method can be used only within a substantially limited scope.

An economical disadvantage (despite of a dramatic improvement in environmental aspects) can be observed also in other conventional examples. For example, Japanese Patent No. 3133146 titled "Recycling Method for Electrophotographic Developer" also brings about the same situation. The publication also suggests a reuse of a carrier. However, to separate a waste toner attached on a waste carrier, a heating treatment and a solvent treatment (cleaning) are performed, thereby resulting in a substantial increase in a cost which cannot generate a profit compared with producing a new carrier.

A common disadvantage that some of the conventional technologies hold lies in that material components of a waste carrier (i.e. an unfunctional carrier, such as a used item or an off-specification item) cannot be comprehensively utilized. In the examples above, to reuse the carrier, a coating material over a toner (a toner attached on the carrier) or the carrier is treated as a residual, which means a non-profitable item, i.e. a non-recyclable item. If the residual portion is able to be converted into a profitable portion, the economical disadvantage can be significantly improved in a recycling practice.

The inventors have been proposing several approaches that manages environmental protection and an economic interest in consistent each other by utilizing components of materials comprehensively in recycling of a developer.

For example, Japanese Patent Application Laid-open No. 2004-033960, titled "Toner Recycling Method and Toner Recycling System" proposes a system of manufacturing a flux for steelmaking by mixing a off-specification toner discharged from a factory or a used toner, with aluminum dross, aluminum dust, and aluminum residue. When using the system, recycling in which no useless component is left from the waste toner, i.e. recycling that manages environmental protection and an economic interest in consistent, can be achieved. However, the publication proposes only an optimal recycling system for a toner in a developer (a carrier and a toner), which is not a proposal for a carrier. For example, a carrier does not serve for a steelmaking flux at all.

Therefore, following to an example disclosed in Japanese Patent Application Laid-open No. 2004-027125, in which the whole subject materials are completely used as a policy of recycling, a recycling system needs to be established by taking a carrier into account.

According to Japanese Patent Application Laid-open No. 2004-027125, titled "Molding Material and Molding Product, Manufacturing Method thereof, and Recycling Method of Waste Toner", a waste toner is used as a molding material by melting and kneading it with modified polyphenylene ether. The waste toner preferably contains a component that contains a resin of styrene acrylonitriles. Accordingly, the waste toner that cannot be provided as a commercial product can be utilized effectively to produce a molding product that has an excellent tensile strength, an excellent elasticity in bending, and an excellent bending strength, and can be widely used for applications and in fields at low cost. However, a subject of this proposal is also a toner, not recycling of a carrier. Furthermore, the proposal seems to manage environmental protection and an economic interest in consistent at first glance, however, an inadequacy remains in an environmental aspect. Specifically, a resin of styrene acrylonitriles and modified polyphenylene ether are very special materials, which can be used only for quite limited parts as described in the proposal. Thus, a material recycle is available for at once, but when recycled parts are put into the market, and again brought into used parts afterwards, a demand for the parts is hardly continued at the initial level. Therefore, a multi-layer material recycle is not maintained, as a result, those parts are inevitably thrown into energy recovery. This results in nothing but destroying possibility of the multi-layer material recycle (in which a material recycle is repeated for avoiding exhaustion of resources) of modified polyphenylene ether itself and a toner itself.

SUMMARY OF THE INVENTION

It is an object of the present invention to at least partially solve the problems in the conventional technology.

According to an aspect of the present invention, a method of recycling a double component developer that contains a carrier and a toner used for an image forming device such as office automation equipment includes collecting a certain amount of a carrier; collecting a certain amount of a reducing metal powder; and producing a thermite reaction by mixing collected carrier and collected reducing metal powder.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is an example of transmitted information in the third embodiment;

DETAILED DESCRIPTION OF THE PREFERRED EMBODIMENTS

Exemplary embodiments of the present invention will be explained below in detail with reference to accompanying drawings.

A first embodiment of the present invention is explained below. Focusing on energy normally generated from an oxide, the invertors of the present invention have discovered that an industrial waste can be utilized as a resource; and that a thermite redox agent can be made by using a metal powder of a byproduct or an industrial waste that can reduce most oxides as a reducing metal agent, and using a carrier in a double-component developer for an image forming device as an oxidizing agent.

A method for recycling a carrier according to the first embodiment is explained below. A category of recycling a carrier by the method below corresponds to the material recycling of the approach 4.

Figure 1:
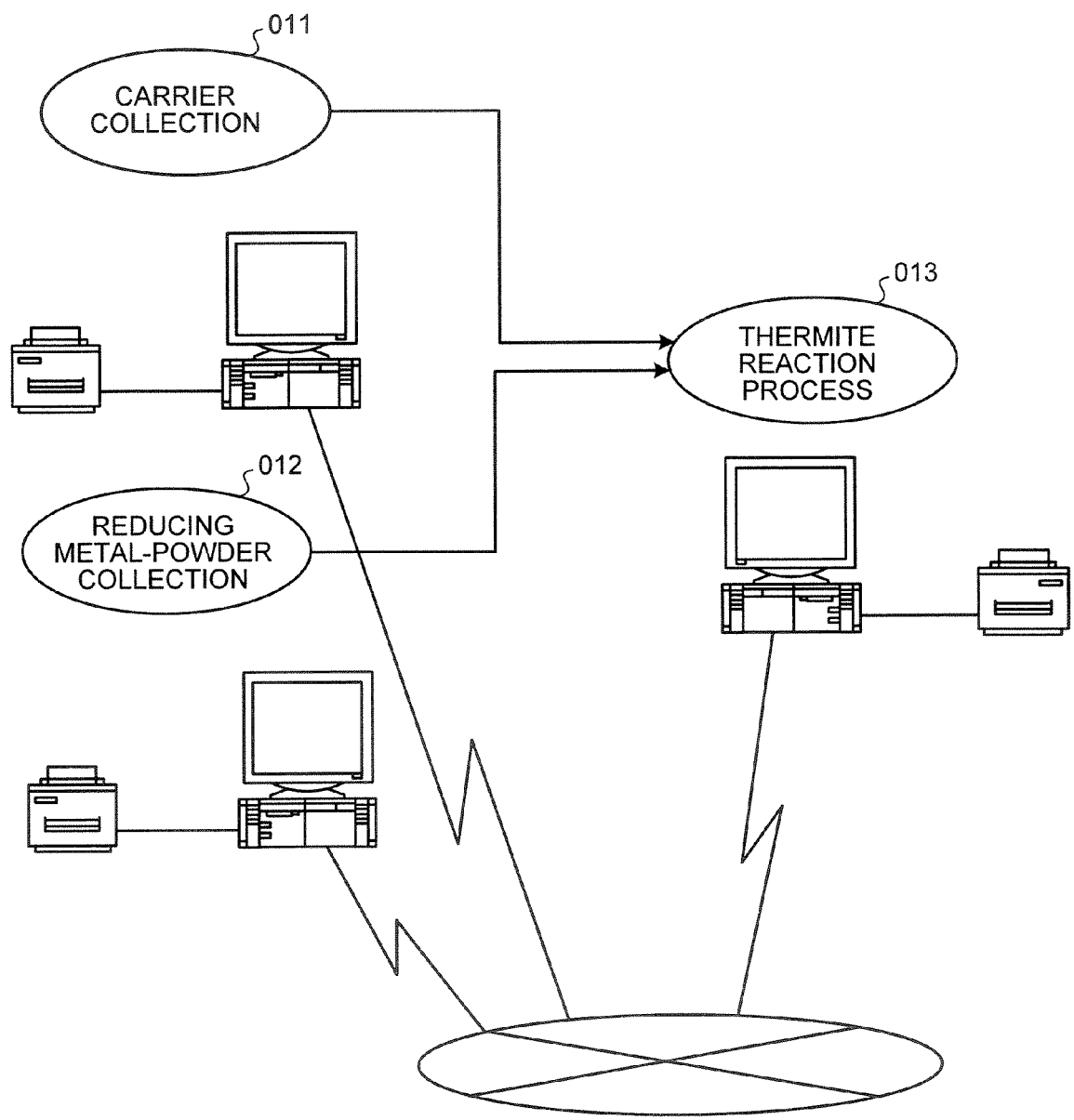
FIG. 1 is a schematic for explaining a first embodiment according to the present invention.

In FIG. 1, a carrier is collected via a carrier collection 011. A subject carrier to be collected is usually a carrier that cannot be utilized as its primary function for image forming in office automation equipment by some reasons, and also includes other forms. On the other hand, a powder that primarily contains a single metal or a composite of two or more metals originating from magnesium, titanium, silicon, and an alloy and a reducing compound of each of those metals, is collected via a reducing metal powder collection 012. An individually collected carrier and an individually collected reducing metal powder are then sent to a thermite reaction process 013.

In the thermite reaction process 013, a carrier is used as a metal oxide material. A material used as a carrier is generally iron oxide, magnetite, and ferrite with zing and copper. Ferrite with zing and copper contains Fe3O4 at 80% by weight, so that it can provide a sufficient effect as an oxygen carrier.

On the other hand, a reducing metal powder above described can be made from a dust powder, a cut powder, or a ground powder that are generated as a byproduct or a waste from trimming, grinding, or other various machining processes of a single metal or an alloy, and of which a particle is three millimeters or less in size, or processed into three millimeters or less in size.

A powder and a dust powder arising from machining, such as grinding, shotblasting, trimming, and cutting magnesium and magnesium alloy usually contain metal magnesium at 60% by weight or more. The dust powder has a particle form with 150 micrometers of a surface area that leads to oxidation physically effectively, whereby being suitable as a material of a thermite redox agent. Many of powder particles are collected via a wet method due to a strong affinity with oxygen, from which a reducing metal material having an effective reaction can be produced by dewatering or drying.

Many of reducing metal powders arising from trimming, cutting and grinding titanium, a titanium alloy, silicon, and a silicon reducing compound contain a reducing metal component at 60% by weight or more. Those powder particles with three millimeters or less in size can be a suitable material of a thermite redox agent in terms of physical characteristics. Many of the powder particles are also collected via a wet method, likewise from which a reducing metal material having an effective reaction can be produced by dewatering or drying.

A thermite reactant can be utilized as a powder mixture with various materials. Powder particles of the thermite reactant can be formed by granulating to be utilized. Particularly in the later case, a waste toner can be utilized as a binder for granulating and shaping.

By using a powder that primarily contains a single metal or a composite of two or more metals originating from magnesium, titanium, and silicon, which can reduce most oxides with energy normally generated from an oxide, and an alloy and a reducing compound of each of those metals as a reducing metal material, and using a carrier as an oxidizing metal material, a thermite redox agent with an effective reaction can be provided. Moreover, by using a byproduct and an industrial waste, the thermite redox agent can be provided at low cost.

Furthermore, based on energy normally generated from an oxide, a single material or a mixture of two or more among reducing metal materials described above can be utilized as a reducing agent for a metal oxide, a heating agent, or a combusting agent.

The inventors have already proposed a technology, titled "Method of Collecting Thermite Redox Agent and Valuable Metal", as describe below.

The object is to provide a method that contributes to effective use of resources and life extension of a final disposal site, and a method that can decrease a cost of collecting and processing a valuable metal by performing a simple concentration of a platinum group element contained in a trace amount mainly in a catalyst for automobile exhaust. In the method, a reducing material primarily contains a single metal or a composite of two or more metals originating from aluminum, magnesium, titanium, silicon, an alloy or a reducing compound of each of those metals, while an iron oxide material is under incomplete oxidation where an amount of the iron oxide material is not more than a chemical equivalent to a content amount of the reducing material. When producing a thermite redox agent containing the reducing material and the iron oxide material, the reducing material and the iron oxide material are both present in a powder form. The reducing material contains aluminum, magnesium, titanium, or silicon at 50% by weight or more. An average diameter of a product is four millimeters or less. Accordingly, an iron oxide material originating from an electrographic developer can be utilized as a metal oxide. Furthermore, by controlling a mixing proportion of each material to be combined, a reaction can be controlled differently. Another valuable material is not necessarily to be added. A material to be mixed has a small diameter so that mixing each material is relatively easy. Each component of the material has a uniform composition, and an excellent fluidity without viscosity and agglutinability, so that the material can be easily handled. The material can be easily formed into a briquette. The material can be an excellent thermite redox agent. Consequently, a thermite redox agent can be provided at low cost. A solution to the object provides a thermite redox agent that includes a reducing material that primarily contains a single metal or a composite of two or more metals originating from aluminum, magnesium, titanium, silicon, an alloy or a reducing compound of each of those metals, and a iron oxide material that is under incomplete oxidation where an amount of the iron oxide material is not more than a chemical equivalent to a content amount of the reducing material. The reducing material and the iron oxide material are both present in form of powder of which an average diameter is four millimeters or less. The reducing material contains aluminum, magnesium, titanium, or silicon at 50% by weight or more. An average diameter of a product is three millimeters or less.

A second embodiment is explained below. The second embodiment is an example where a waste aluminum powder is utilized as a reducing metal powder.

A powder and a dust powder arising from machining such as grinding, shotblasting, trimming, and cutting aluminum and an aluminum alloy also usually contain metal aluminum 60% by weight or more. The dust powder has a particle form with 150 micrometers of a surface area similarly to that of magnesium, and is also physically effective in oxidation. Furthermore, it is also similar to that of magnesium, titanium, and silicon or the like, that many of powder particles are collected via a wet method, from which a reducing metal material with an effective reaction can be produced by dewatering and drying. Therefore, aluminum is also suitable as a material of a thermite redox agent.

The inventors researched thermite reactions when an aluminum powder and a carrier are mixed. Results of the thermite reactions are shown in Tables 1 to 3.

TABLE 1

| | Material | | | |
|---|---|---|---|---|
| Material name | | Component | Particle size | Material history |
| Aluminum | Atomized powder | Al > 99% | # - 100 | Pure Al materialt |
| | Collected shot blast dust | Al > 80% | # - 100 | Plant byproduc |
| | Grinding dust | Al > 70% | - 3 mm | Market collected item |

TABLE 1-continued

| | Material | | | |
|---|---|---|---|---|
| | Material name | Component | Particle size | Material history |
| Oxide material | Melted dross | Al > 60% | - 3 mm | Plant byproduct |
| | Iron oxide | $Fe_2O_3$ > 90% | # - 100 | Pure iron oxide material |
| | Developer (carrier) | $Fe_3O_4$ > 70% | # - 100 | Plant byproduct |

TABLE 2

Content ratio and form

| Sample Number | Material name | Content ratio | | Form |
|---|---|---|---|---|
| 1 | Al atomized powder | 30% | Iron oxide 70% | Mixed powder item |
| 2 | Al shot blasting powder | 30% | Carrier 70% | Mixed powder item |
| 3 | Al grinding powder | 30% | Carrier 70% | Powder mixture |
| 4 | Al dross | 30% | Carrier 70% | Powder mixture |

TABLE 3

Result
Powder mixed sample

| | Sample Number | | | |
|---|---|---|---|---|
| | 1 | 2 | 3 | 4 |
| Flammability | G | G | G | RG |
| Exothermic reaction | G | G | G | G |

G: Good
RG: Late initial reaction but good reactiviy
B: Unacceptable

Figure 2:
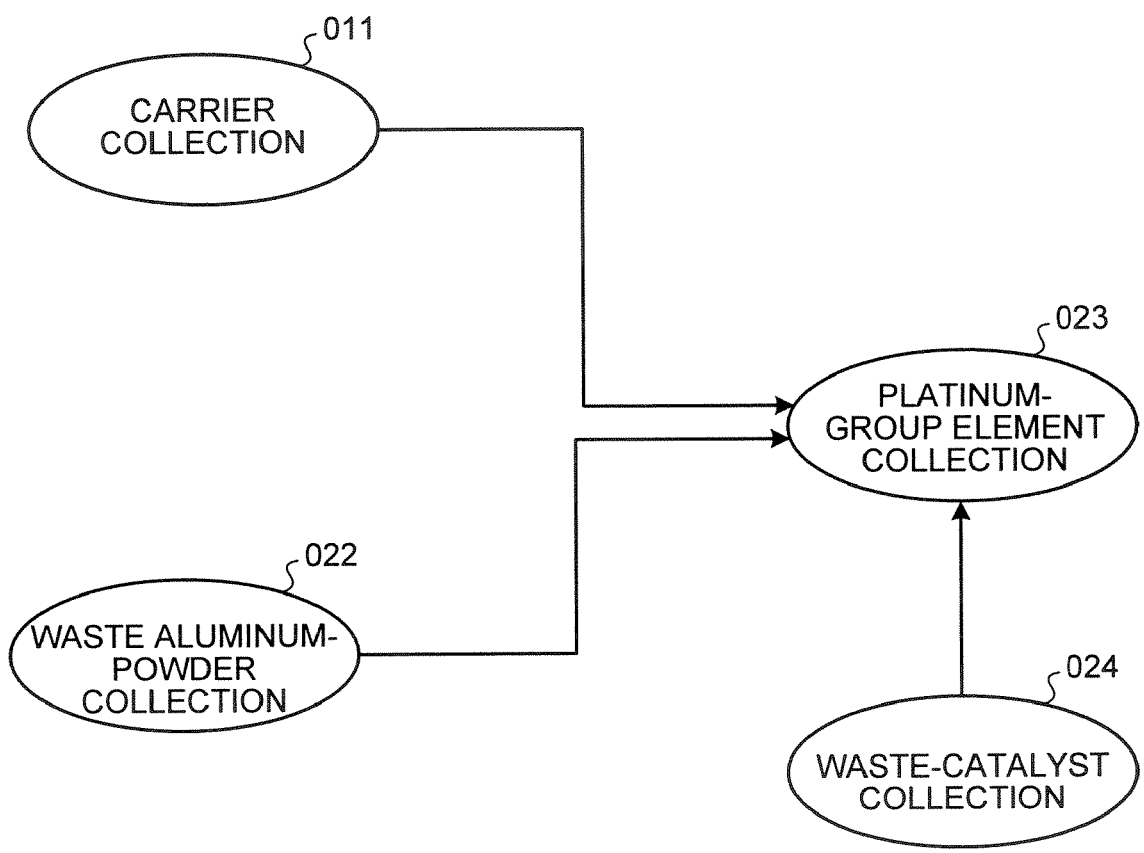
FIG. 2 is a schematic of relation between processes in a method according to a second embodiment.

In the second embodiment, the reducing metal-powder collection 012 explained the example in FIG. 1 corresponds specifically to a waste aluminum-powder collection 022 shown in FIG. 2. The waste aluminum-powder collection 022 is a process of collecting a waste aluminum powder, for example, internally generated inside an aluminum plant. In addition, it can be a process of collecting a waste aluminum powder arising from the market.

Specific utilization of a thermite reaction is explained. As an example, a collection of a platinum group element (platinum group metal) from a catalyst for automobile exhaust, i.e. the material recycle of a platinum group element can be considered.

In connection with catalysts for automobile exhaust, the collection of a platinum group element has been conventionally carried out from a waste catalyst disposed together with scrapping a used car and a byproduct (in-house waste items) generated while manufacturing a product (catalyst) in a catalyst plant. However, a percentage of content of each component of platinum group elements, Pt, Pd, and Rh is low, at 0.1%, so that a melting concentration of a platinum group element before a wet-smelting is required. Because a catalyst primarily contains alumina, silica, cordierite, selenyl, or the like, a melting furnace that ensures a heat source of 1400° C. or higher is needed to concentrate a platinum group element that is melted and dispersed in the catalyst, thereby needing a large amount of facility investment and a large amount of electric energy for melting.

In contrast, by using a thermite redox agent, a platinum group element can be highly efficiently melted and concentrated in a crucible. In FIG. 2, firstly a waste catalyst in a scrapped car and a waste catalyst discharged from a factory are collected via a waste catalyst collection 024, and then those waste catalysts are supplied to a platinum-group element collection 023. During the platinum-group element collection 023, a platinum group element is concentrated by thermite reaction. This concentration is part of the platinum-group element collection 023, accordingly, the platinum-group element collection is hereinafter referred to as the same meaning of platinum-group element concentration.

As an example of a test that was actually performed, a result of the test that checked concentration by using a waste catalyst collected from a scrapped car and utilizing thermite redox reaction with an aluminum powder as a reducing metal powder is presented below.

Firstly, primary components of waste catalyst samples subjected to a fluorescent X-ray analysis are presented in a table 4.

TABLE 4

Primary component in value of fluorescent
X-ray analysis of catalyst sample (W/%)

| O | Al | Zr | Ce | C | Pt | Pd |
|---|---|---|---|---|---|---|
| 33 | 23 | 19 | 15 | 4 | 0.1 | 0.2 |

Secondly, a table 5 of test samples for the concentration check is presented below.

TABLE 5

Concentrated test sample (W/%)

| Sample material name | Material | Material content ratio | Sample material content ratio | |
|---|---|---|---|---|
| | | | Sample A | Sample B |
| Waste catalyst | | | 40 | 57 |
| Thermite redox agent | Aluminum shot blasting powder | 50 | 30 | 0 |
| | Photocopier carrier | 50 | | |
| Melting accelerating flux | Sodium carbonate | 50 | 20 | 29 |
| | Sodium borate | 50 | | |
| Cut copper powder | | | 10 | 14 |

A sample A in the table 5 contained a catalyst material at 40% by weight of which primary components were alumina, zirconia and selenyl and which also contained Pt at 1000 ppm and Powder at 2000 ppm, a thermite redox agent at 30% by weight in which a aluminum shotblasting powder and a photocopier carrier were mixed at a ratio of 50 to 50, a flux at 20% by weight as a melting accelerator in which sodium carbonate and sodium borate were mixed at a ratio of 50 to 50, and a cut scrap copper at 10% by weight as an absorbent. The materials were mixed and shaped into a rounded compressed cube with 25 millimeters per side with a high pressure press to form the sample A.

A melting condition was checked with a sample B in the table 5, which did not contains thermite redox agent, as a comparative sample for checking melting condition.

A melting condition was checked with a heating test that 500 grams each of a sample containing a thermite redox agent and a sample without a thermite redox agent was put into a crucible, which was heated from room temperature. The sample A showed a thermite reaction at 950° C., and then the temperature inside the crucible rapidly rose to 1100° C., whereby the sample A was partially melted. In contrast, the sample B was not melted despite that the temperature inside the crucible was raised to 1100° C.

To check a melting in a practical condition, the sample A was continuously charged up to 500 grams into the crucible that had been heated to 1000° C. As a result, a thermite redox reaction was observed instantaneously, and then the temperature inside the crucible rose to 1200° C., the sample A turned into individual melts. In contrast, no change was observed in the sample B.

The both samples A and B were crushed to check a form and components of a piece of metal of 20 mesh or larger in size. As a result, a metal in the sample A that primarily contained copper became granular, and both Pt and Pd were detected from the metal via an inductively coupled plasma (ICP) analysis. In contrast, metals in the sample B were in form of cut copper powder as an initial material condition when added, and Pt and Pd were not detected from the metals via the ICP analysis.

Due to the result, it is obvious that melting can be accelerated by mixing a thermite redox agent, so that a platinum group metal dispersed in a catalyst can be absorbed and concentrated onto a copper metal component as an absorbent metal.

Weights of the samples, the result of the check test of melting condition, and the result of component analysis are shown in a table 6, a table 7, and a table 8, respectively.

TABLE 6

Weight of sample and result of component analysis (gram)

| | Sample A | Sample B |
|---|---|---|
| Weight of sample | 500 | 500 |
| Weight of metal larger than mesh 20 after crushed | 40 | 55 |

TABLE 7

Result of check test of melting condition

| Test condition | Sample A | Sample B |
|---|---|---|
| Charging sample at room temperature to raise up | Partially melted | Not melted |
| Charging sample into crucible furnace after raised to 1000° C. | Whole melted | Not melted |

TABLE 8

Result of component analysis

| ICP analysis value | Sample A | Sample B |
|---|---|---|
| Pt | 0.41 W/% | 0.00 W/% |
| Pd | 0.98 W/% | 0.00 W/% |

Figure 3:
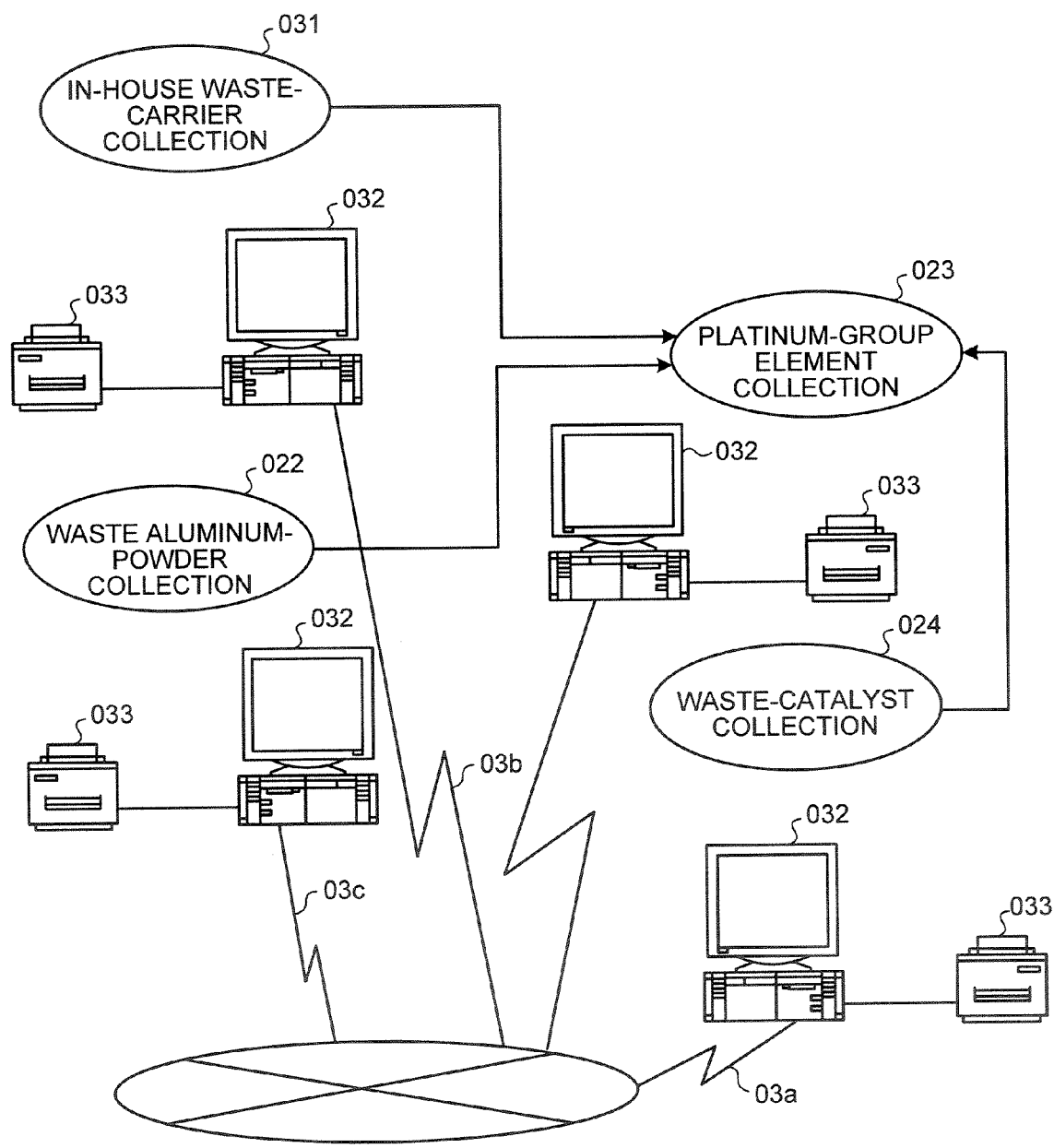
FIG. 3 is a schematic for explaining a third embodiment.

A third embodiment is explained below. In the third embodiment, a specific example of the carrier collection 011 in the first and second embodiments is described with reference to FIGS. 3 and 4. The carrier collection 011 in the first and second embodiments can be specifically an in-house waste carrier collection 031 that is operated inside a plant for manufacturing a carrier. In this case, a carrier to be collected via the in-house waste carrier collection 031 is a carrier that is out of specifications for a production line in the plant.

Figure 4:
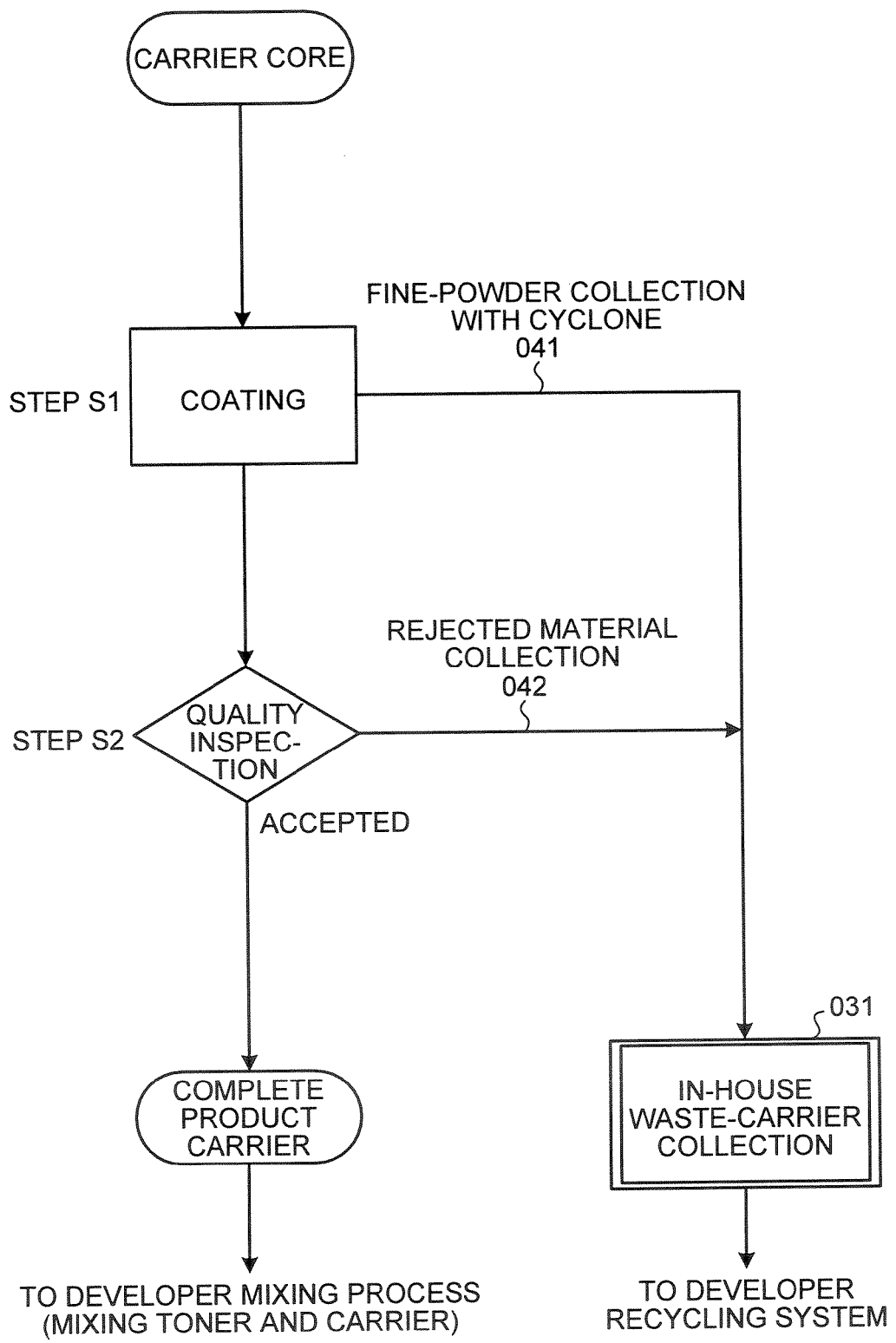
FIG. 4 is a flow chart of the third embodiment.

FIG. 4 is a flow chart of manufacturing a carrier in a carrier plant and collecting a waste carrier.

At a step 1 of coating, a carrier core, such as ferrite, is coated with a resin. This coating generally uses a so-called fluidized bed method. A carrier coating device according to the fluidized bed method is provided with a cyclone usually inside the device. Excessively fine powder among a carrier, which is out of a size-specification, is extracted with the cyclone, and then collected as a waste carrier via a fine-powder collection with cyclone 041.

At a step 2 of quality inspection, a carrier after coated is inspected. Properties, such as a magnetic property, of the carrier is inspected by a desired unit. A carrier that is rejected at this inspection, which is out of an inspection-specification, is also collected as a waste carrier via a rejected material collection 042. The waste carriers are then supplied to the platinum-group element collection 023 in FIG. 3 later to be recycled. In the flow chart in FIG. 4, a carrier to be sent to the in-house waste carrier collection 031 is the carriers collected via the fine-powder collection with cyclone 041 and the rejected material collection 042.

Next, an example of information transmission is explained. To operate the entire system in FIG. 3 smoothly, various pieces of information are transmitted to respective processes (031, 022, 023, and 024). An example of an information transmission for filling a plan of a platinum-group element collection is explained below.

A plan of collecting a platinum group metal via the platinum-group element collection 023, which can be also referred to as a material recycling plan of a platinum group metal, is determined basically depending on a state of the waste catalyst collection from scrapped cars. In other words, to what extent a waste carrier and a waste aluminum powder to produce a thermite reaction is required is determined by calculating based on a collected amount of waste catalysts. Therefore, firstly, at the waste catalyst collection 024, an amount of a collected waste catalyst is transmitted to the platinum-group element collection 023 as waste-catalyst collected-amount information 03a. Secondly, based on the information 03a, at the platinum-group element collection 023, an estimated amount of a platinum group metal to be collected is calculated with an information processing unit, and to what extent a waste carrier and a waste aluminum powder are required in order to produce a thermite reaction necessary for the platinum-group metal collection, i.e. respective amounts demanded for a waste carrier and a waste aluminum powder, are calculated.

Consequently, from the platinum-group element collection 023, carrier demanded-amount information 03b is transmitted based on an obtained amount demanded to the in-house waste carrier collection 031, while waste aluminum-powder demanded-amount information 03c is transmitted to the waste aluminum-powder collection 022. An example of the information transmission is described below.

The carrier demanded-amount information 03b is created with a computer 032 provided at the platinum-group element collection 023. The carrier demanded-amount information 03b is transmitted also with the computer 032 to the in-house waste carrier collection 031 via the Internet. On the other hand, a further computer 032 is also provided at the in-house waste carrier collection 031, and the carrier demanded-amount information 03b transmitted via the Internet is received with the further computer 032, and contents of the information 03b are confirmed. Similarly, the waste aluminum-powder demanded-amount information 03c is created with, such as a computer 032 at the platinum-group element collection 023, and transmitted via the Internet. On the other hand, at the waste aluminum-powder collection 022, the waste aluminum-powder demanded-amount information 03c transmitted via the Internet is received with a computer 032, and contents of the information 03c are confirmed. Various information transmitting methods can be applied.

The carrier demanded-volume information 03b transmitted between these computers is presented, for example, in a form of a table 05a shown in FIG. 5. The table 05a is created at the platinum-group element collection 023, and contents of the table 05a are confirmed at the in-house waste carrier collection 031. In the table 05a, an amount of a carrier required to produce a thermite reaction at the platinum-group element collection 023, i.e. a requested purchase amount of the carrier 05b, is written, for example, with respect to each month.

Furthermore, a product code 05c for each carrier is provided, and additionally, a lot number 05d is provided, for example, with respect to each month, thereby allowing management of information to be facilitated at both the platinum-group element collection 023 and the in-house waste carrier collection 031.

Confirmation can be carried out with a hard copy at the platinum-group element collection 023 and the in-house waste carrier collection 031, by outputting the table 05a transmitted via the Internet on paper with a printer 033 or an Internet facsimile (not shown).

Although an above method of the information transmission is to be carried out between the platinum-group element collection 023 and the in-house waste carrier collection 031, information can be transmitted between the platinum-group element collection 023 and the waste aluminum-powder collection 022 in the same way. In this case, a product name in the table 5a is filled with wasted aluminum powder, and the rest of the procedures can be similarly carried out.

A fourth embodiment is explained below. The fourth embodiment presents an example different from the third embodiment with respect to the carrier collection 011. A carrier to be collected in the carrier collection 011 in FIGS. 1 and 2 can be specifically a substance mixed in a used developer available in the market that is a mixture of a carrier and a toner, which means a used carrier.

A developer, which is a double component developer herein, includes a carrier and a toner. When briquetting a thermite reactant for using, a toner can be utilized as a binder as described later, so that the developer can be utilized as it is. However, because a ratio between each amount of a carrier and a toner present in a collected used developer is variable at each collection, i.e. not constant, it is desirable that the toner and the carrier are separated rather than mixed, in order to specify an amount of a carrier for producing a desired amount of thermite reaction.

Figure 6:
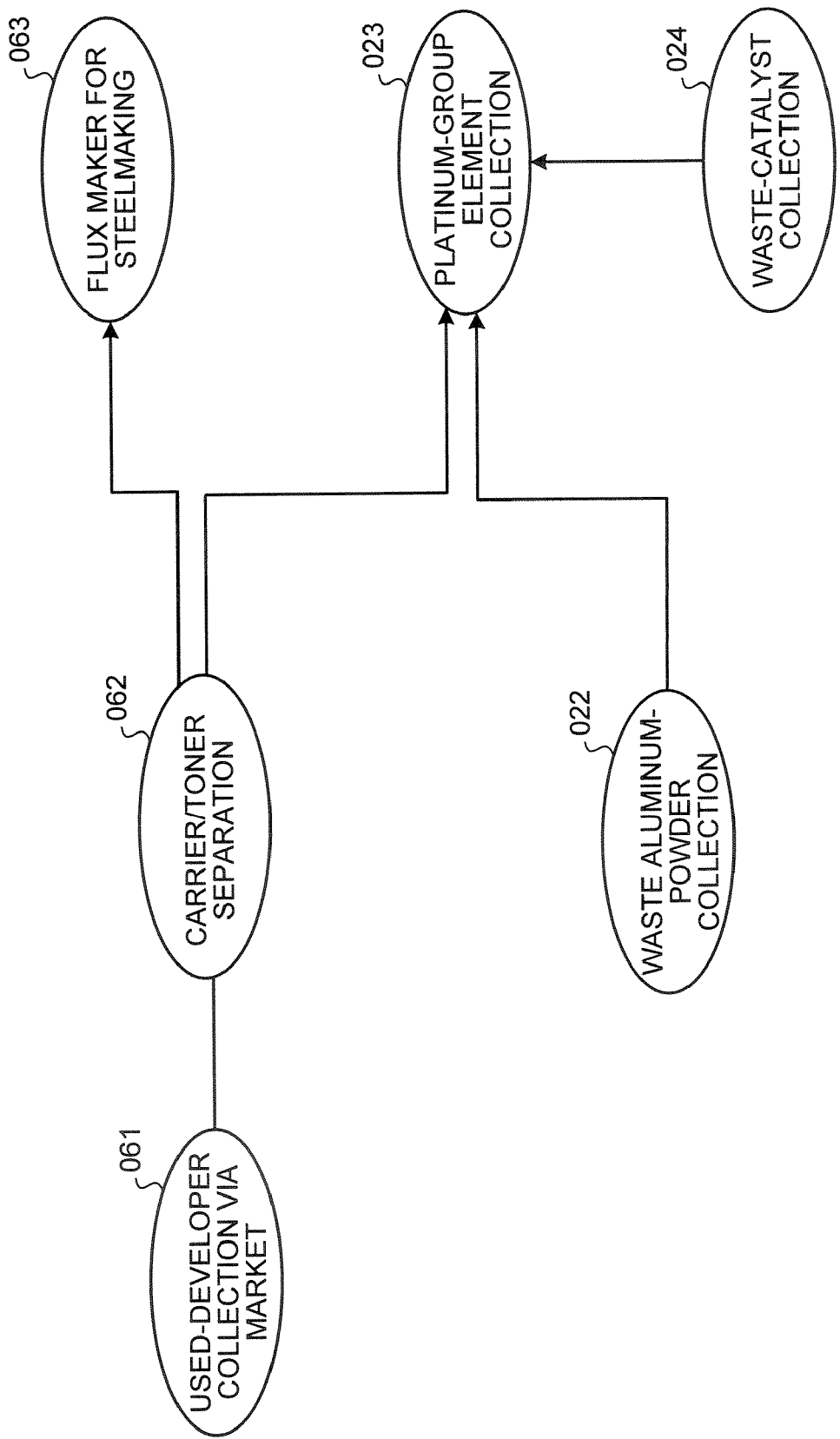
FIG. 6 is a schematic of relation between processes in a method according to a fourth embodiment.

For this reason, a method that achieves separation is designed as shown in FIG. 6. FIG. 6 is a schematic of the method in which a used carrier in the market is utilized. A first process in FIG. 6 is a used-developer collection via market 061. The used-developer collection via market 061 can be carried out when a developer alone is taken out from a photocopier or other equipment being used in the market, including a case where a serviceman exchanges a developer inside a machine during maintenance of the photocopier. Alternatively, there is a case where a used photocopier in the market is disposed in itself to be collected by a maker or other contractors. In the latter case, a used developer is to be taken out by disassembling the photocopier and sorting disassembled components after used-photocopier collection.

Figure 8:
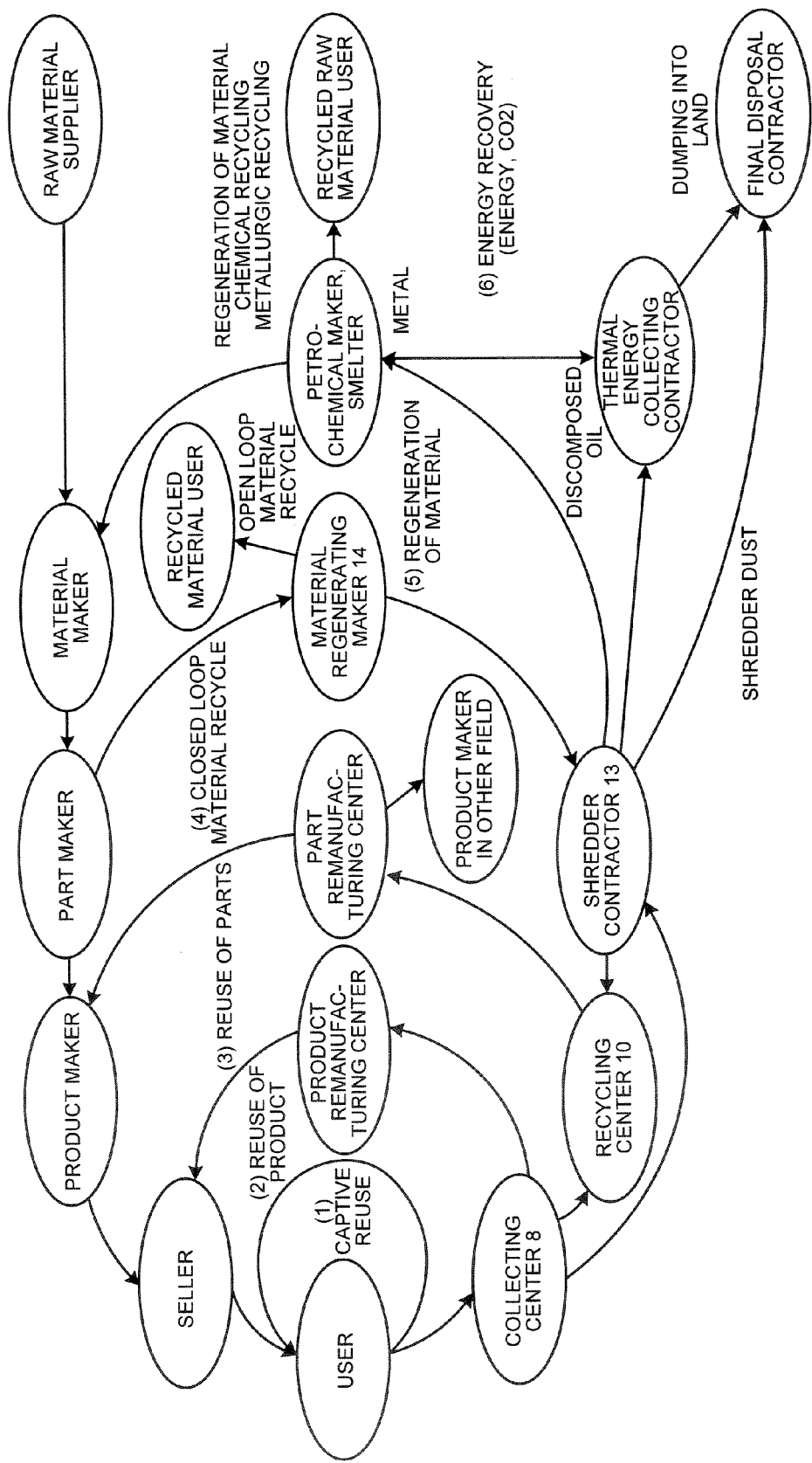
FIG. 8 is a schematic of an example of a used-developer collection via market.

For this reason, the used-developer collection via market 061 can be a collecting center 8 shown in FIG. 8 in some cases, or a recycling center 10 shown in FIG. 8 in other cases.

Next, at the carrier/toner separation 062 as a second process, a developer is actually separated into a carrier and a toner. This corresponds to the recycling center 10 or to a material regenerating maker 14 in the comet circle in FIG. 8. When the material regenerating maker 14 is assigned to the carrier/toner separation 062, as a preliminary step, a developing unit of a photocopier have to be shredded to separate a developer from the others by a shredder contractor 13 in FIG. 8, otherwise a developer needs to be sent to the material regenerating maker 14 without via the shredder contractor 13.

A specific method of separating a carrier and a toner at the carrier/toner separation 062 can be a centrifugal separation with a cyclone, for example. A carrier is tens micrometers in size, while a toner (toner in a double component developer) is a few micrometers up to ten micrometers. Therefore, a size of powder is different between a carrier and a toner, thereby easily classifying, i.e. separating, powders.

Figure 7:
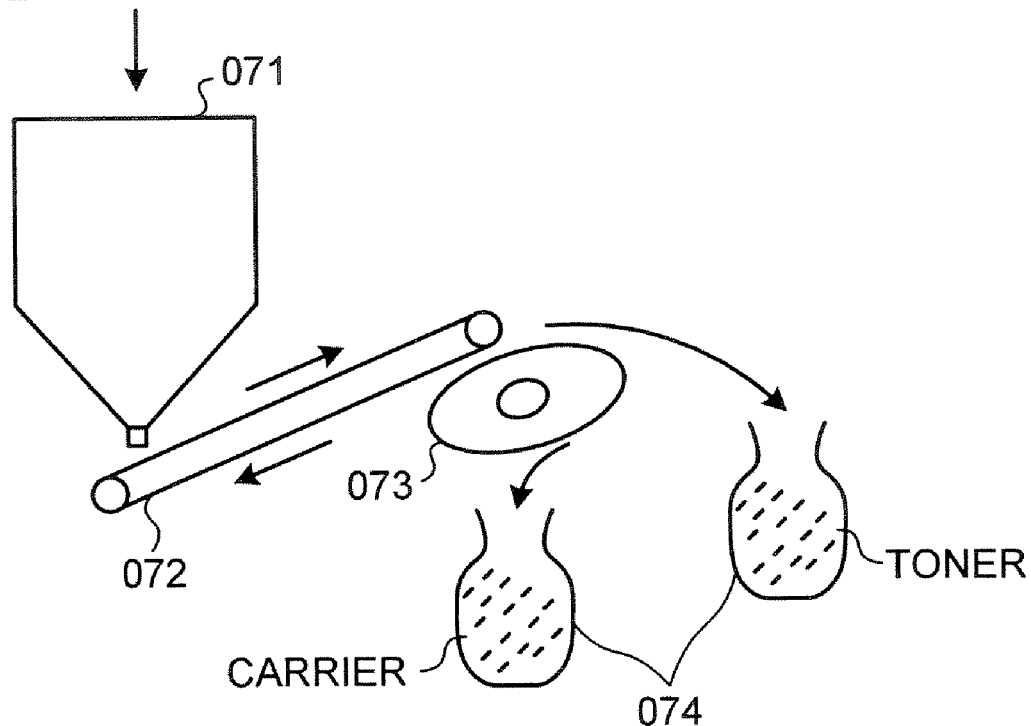
FIG. 7 is a schematic for explaining a method of separating a carrier and a toner.

Alternatively, another method of separating a carrier and a toner can be a magnetic separation shown in FIG. 7. In a double component developer, a carrier is a magnetic powder, while a toner of which most components are resin is a non-magnetic powder. In FIG. 7, a used developer is charged into a popper 071, carried on a belt conveyor 072, and then a carrier and a toner are magnetically separated with a magnet 071. Each of a separated carrier and a separated toner are individually dropped into a flexible container 074 to be collected.

Regardless whether centrifugal or magnetic, as a result of the separation above, a desired carrier can be collected, whereas a waste toner is accumulated at the same time. In this case, a system disclosed in Japanese Patent Application Laid-open No. 2004-033960 proposed by the investors is very effective. Precisely, while a carrier separated at the carrier/toner separation 062 is supplied to the platinum-group element collection 023, a toner is advantageously supplied to the flux maker for steelmaking 063 as a material for a binder.

In this case, a carrier as a material of a thermite reactant and a toner as a material of a flux for steelmaking, of which material components are completely used, i.e. nothing is wasted, can have an economic value, thereby allowing the carrier and the toner to be traded at coast, as a common advantage for the both.

According to an embodiment of the present invention, material components of a carrier are completely utilized; so that a process of removing and disposing part of components of the carrier, which is present in the conventional technology, is omitted from a recycling system; and in consequence, a cost of recycling is minimized. As well as a subject of the recycling, i.e. a carrier itself, a more valuable material, i.e. a platinum group metal, is utilized for the recycling, whereby an economic value of the recycling is further increased, thus, a company can carry out an active and sustainable environmental activity.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of recycling a double component developer that contains a carrier and a toner used for an image forming device such as office automation equipment, the method comprising:

collecting a certain amount of a carrier by separating the toner and the carrier from one another and from the double component developer;

collecting a certain amount of a reducing metal powder;

producing a thermite reaction by mixing collected carrier and collected reducing metal powder in the presence of a platinum group metal contained in a catalyst to form a refining mixture comprising the platinum group metal in molten form; and isolating the platinum group metal from the refining mixture that includes other components of the catalyst and thermite reaction products.

2. The method according to claim 1, wherein the collecting the carrier includes:

collecting a used developer via a market, separating the toner and the carrier from the used developer.

3. The method according to claim 1, wherein the collecting the carrier includes collecting a waste carrier arising from a developer plant.

4. The method according to claim 1, wherein the collecting the reducing metal-powder includes collecting a waste aluminum powder arising from an aluminum plant and a waste aluminum powder available in the market.

5. The method according to claim 1, wherein the collecting the carrier includes supplying a required amount of a carrier to the producing the thermite reaction based on carrier demanded-amount information transmitted from the producing the thermite; and the collecting the waste aluminum-powder includes supplying a required amount of a waste aluminum powder to the producing the thermite reaction based on waste aluminum-powder demanded-amount information transmitted from the producing the thermite reaction.

6. The method according to claim 1, wherein the carrier is an iron oxide material.

7. The method according to claim 1, wherein the reducing metal powder primarily contains one or more metals selected from the group consisting of aluminum, magnesium, titanium and silicon.

8. The method according to claim 1, wherein separating the toner and the carrier from the double component developer forms a carrier composition consisting essentially of a metal oxide and a resin composition consisting essentially of a resin.

9. The method according to claim 1, wherein the separating forms a carrier-containing composition that is magnetic and a resin composition that is non-magnetic.

10. The method according to claim 1, wherein the thermite reaction is produced by mixing the collected carrier and the collected reducing metal powder with a waste catalyst containing the platinum group metal and an inorganic carrier.

11. The method according to claim 10, wherein the waste catalyst comprises 0.1% by mass or less of the platinum group metal.

12. The method of claim 1, wherein the producing includes carrying out the thermite reaction in the presence of a waste catalyst comprising the platinum group metal, and wherein during the producing the thermite reaction forms a liquid platinum group metal which is absorbed in copper present in the refining mixture.

13. The method according to claim 1, wherein the toner and the carrier are separated by cyclone centrifugation.

14. The method according to claim 1, wherein the reducing metal powder comprises at least one of Mg, Ti and Si.

* * * * *